(12) United States Patent
Akira et al.

(10) Patent No.: US 11,362,321 B2
(45) Date of Patent: Jun. 14, 2022

(54) NEGATIVE ELECTRODE MATERIAL AND NON-AQUEOUS ELECTROLYTE SECONDARY BATTERY

(71) Applicant: Panasonic Intellectual Property Management Co., Ltd., Osaka (JP)

(72) Inventors: Tatsuya Akira, Osaka (JP); Taisuke Yamamoto, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 261 days.

(21) Appl. No.: 16/498,205

(22) PCT Filed: Feb. 14, 2018

(86) PCT No.: PCT/JP2018/004963
§ 371 (c)(1),
(2) Date: Sep. 26, 2019

(87) PCT Pub. No.: WO2018/179934
PCT Pub. Date: Oct. 4, 2018

(65) Prior Publication Data
US 2021/0104728 A1   Apr. 8, 2021

(30) Foreign Application Priority Data

Mar. 30, 2017 (JP) .............................. JP2017-069110

(51) Int. Cl.
| | |
|---|---|
| *H01B 1/08* | (2006.01) |
| *H01M 4/133* | (2010.01) |
| *H01M 4/36* | (2006.01) |
| *H01M 4/587* | (2010.01) |
| *H01M 4/62* | (2006.01) |

(Continued)

(52) U.S. Cl.
CPC .............. *H01M 4/133* (2013.01); *H01B 1/08* (2013.01); *H01M 4/364* (2013.01); *H01M 4/587* (2013.01); *H01M 4/628* (2013.01); *H01M 10/0525* (2013.01); *H01M 2004/027* (2013.01)

(58) Field of Classification Search
CPC ........... H01B 1/00; H01B 1/08; H01M 4/133; H01M 4/364; H01M 4/587; H01M 4/625
See application file for complete search history.

(56) References Cited

U.S. PATENT DOCUMENTS

| | | | |
|---|---|---|---|
| 5,707,756 A * | 1/1998 | Inoue .................. | H01M 50/578 429/57 |
| 10,312,516 B2 * | 6/2019 | Akira .................. | H01M 4/1397 |
| 2004/0023115 A1 | 2/2004 | Kato et al. | |

(Continued)

FOREIGN PATENT DOCUMENTS

| | | |
|---|---|---|
| JP | 2004-127913 A | 4/2004 |
| JP | 2004-146292 A | 5/2004 |

(Continued)

OTHER PUBLICATIONS

English language translation of PCT/ISA/237 (mailed May 2018).*

(Continued)

*Primary Examiner* — Mark Kopec
(74) *Attorney, Agent, or Firm* — WHDA, LLP

(57) ABSTRACT

A negative electrode material includes a graphite material, an alkali metal salt, and at least one metal material selected from the group consisting of Fe, Mn, Mg, Ni, Pd, Rh, Os, and Pt. The graphite material contains natural graphite.

8 Claims, 1 Drawing Sheet

(51) Int. Cl.
  *H01M 10/0525* (2010.01)
  *H01M 4/02* (2006.01)

(56) References Cited

U.S. PATENT DOCUMENTS

| | | |
|---|---|---|
| 2006/0166098 A1 | 7/2006 | Tabuchi et al. |
| 2010/0243964 A1 | 9/2010 | Lee et al. |
| 2015/0287989 A1* | 10/2015 | Hirose ............... H01M 4/136 429/217 |
| 2016/0351947 A1 | 12/2016 | Kamo et al. |
| 2017/0117543 A1* | 4/2017 | Park ................... H01M 4/131 |
| 2018/0166738 A1 | 6/2018 | Kimura et al. |
| 2018/0241076 A1* | 8/2018 | Nishiura ............. H01M 10/052 |
| 2018/0287148 A1 | 10/2018 | Akira et al. |

FOREIGN PATENT DOCUMENTS

| | | |
|---|---|---|
| JP | 2004-200115 A | 7/2004 |
| JP | 2012-522351 A | 9/2012 |
| JP | 2015-149224 A | 8/2015 |
| JP | 2017-050203 A | 3/2017 |
| WO | 2016/121320 A1 | 8/2016 |

OTHER PUBLICATIONS

International Search Report dated May 15, 2018, issued in counterpart Application No. PCT/JP2018/004963. (1 page).

Nagai et al, "Development of High-capacity and Highly-reliable Batteries for Mobile-use and Medium- and Small-sized Batteries for Industrial Application", Hitachi Review, Japan, Hitachi Review Corporation, Dec. 1, 2010, vol. 92, No. 12, pp. 38-41, with partial English translation. (8 pages).

* cited by examiner

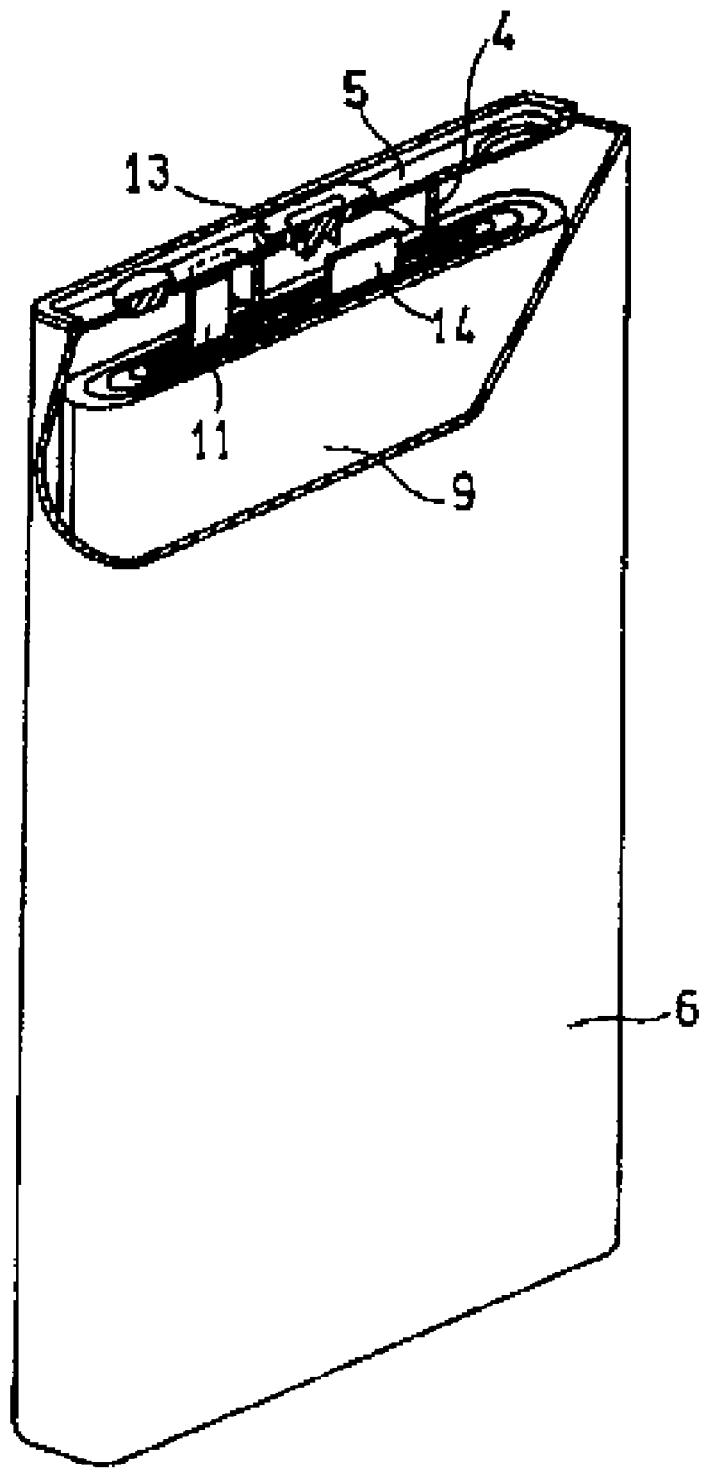

NEGATIVE ELECTRODE MATERIAL AND NON-AQUEOUS ELECTROLYTE SECONDARY BATTERY

TECHNICAL FIELD

The present invention mainly relates to an improvement of a negative electrode for non-aqueous electrolyte secondary batteries.

BACKGROUND ART

Non-aqueous electrolyte secondary batteries, particularly lithium ion secondary batteries, because of their high voltage and high energy density, have been expected as promising power sources for small consumer applications, power storage devices, and electric cars.

For a negative electrode material, graphite materials are widely used, among which artificial graphite is mainly used. Artificial graphite, however, needs to be processed from a graphite precursor at a temperature as high as 3000° C. or more, and is expensive. Under such circumstances, studies have been made to use natural graphite, which is less expensive than artificial graphite.

Patent Literature 1 discloses a negative electrode material obtained by mixing SiO particles coated with a flake graphite, mesocarbon fibers containing boron, natural graphite, and artificial graphite, in a mass ratio of 10:40:30:20. The SiO particles are composite particles comprising a $SiO_2$ phase and Si particles dispersed therein.

On the surface of natural graphite, an oxygen-containing functional group, such as a carbonyl group, an aldehyde group, and a hydroxyl group, is inherently present. The functional group contributes to the formation of a solid electrolyte interface (SEI) coating layer on the surface of natural graphite in charge and discharge process. However, since the stability of the formed coating layer is low, the high-temperature storage characteristics of the battery degrade. Therefore, in Patent Literature 1, which uses a negative electrode material containing much natural graphite, the high-temperature storage characteristics of the battery degrade.

To address this, Patent Literature 2, aiming to increase the stability of the coating layer, discloses immersing a graphite material such as natural graphite in an alkaline solution to introduce a predetermined functional group to the surface of the graphite material, to uniformly form a coating layer with good quality.

CITATION LIST

Patent Literature

[PTL 1] Japanese Patent Laid-Open No. 2004-146292
[PTL 2] Japanese Patent Laid-Open No. 2004-200115

SUMMARY OF INVENTION

However, even with the technique disclosed in Patent Literature 2 using an alkaline solution, due to insufficient introduction of a predetermined functional group and other reasons, the high-temperature storage characteristics of the battery cannot still be improved sufficiently.

In view of the above, one aspect of the present disclosure relates to a negative electrode material including a graphite material, an alkali metal salt, and at least one metal material selected from the group consisting of Fe, Mn, Mg, Ni, Pd, Rh, Os, and Pt, the graphite material containing natural graphite.

Another aspect of the present disclosure relates to a non-aqueous electrolyte secondary battery, including a negative electrode including the aforementioned negative electrode material, a positive electrode, and a non-aqueous electrolyte.

According to the present disclosure, when the negative electrode material contains natural graphite, a non-aqueous electrolyte secondary battery having excellent high-temperature storage characteristics can be obtained.

BRIEF DESCRIPTION OF DRAWING

The Drawing is a schematic partially cut-away oblique view of a non-aqueous electrolyte secondary battery according to an embodiment of the present invention.

DESCRIPTION OF EMBODIMENTS

A negative electrode material according to an embodiment of the present invention includes a graphite material, an alkali metal salt, and at least one metal material selected from the group consisting of Fe, Mn, Mg, Ni, Pd, Rh, Os, and Pt. The graphite material contains natural graphite.

In the presence of a metal material such as Fe, surface modification of natural graphite by reaction with an alkali metal salt proceeds efficiently. This facilitates the formation of a good-quality and uniform SEI coating layer with excellent stability on the surface of the natural graphite, in charge and discharge process. This results in improved high-temperature storage characteristics of the battery. Here, the surface modification of the natural graphite includes introduction of a predetermined functional group such as a hydroxyl group into the surface of the natural graphite, exchange of the functional group inherently present on the surface for a predetermined functional group, and amorphization of the surface.

The surface modification of natural graphite is carried out, for example, in a negative electrode slurry used for producing a negative electrode, the slurry comprising a negative electrode material dispersed in a dispersion medium. In the negative electrode slurry, a metal material such as Fe is considered to act as a catalyst that facilitates the above surface modification. Without the necessity of separately performing an alkali treatment step using an alkaline solution, the above surface modification can be carried out efficiently in the negative electrode production step.

(Graphite Material)

A graphite material means a material having a graphite-type crystal structure. The graphite material exhibits excellent stability during charging and discharging and has small irreversible capacity. The graphite material includes natural graphite which is cost-advantageous. The graphite material may include, in addition to natural graphite, artificial graphite, and graphitized mesophase carbon particles. Among them, artificial graphite is preferable. In the negative electrode material, natural graphite and artificial graphite may be present as particles, or as composite carbon particles having a natural graphite part and an artificial graphite part.

The content of the natural graphite in the graphite material is preferably 40 mass % or more. When the content of the natural graphite in the graphite material is 40 mass % or more, the content of the artificial graphite becomes low, and the cost can be reduced. However, due to a high content of the natural graphite, the high-temperature storage characteristics are likely to degrade. Therefore, by using an alkali metal salt and a metal material such as Fe, the high-temperature storage characteristics improvement effect can be remarkably obtained.

The content of the natural graphite in the graphite material can be determined, for example, by X-ray diffractometry. Specifically, a negative electrode (negative electrode mixture layer) taken out from a disassembled battery is subjected to X-ray diffraction measurement, to obtain an X-ray diffraction pattern. The graphite material includes a rhombohedral crystal structure and a hexagonal crystal structure, and diffraction peaks attributed to the respective structures are observed. A (101) plane diffraction peak attributed to the rhombohedral crystal structure is observed around $2\theta=43.3°$. On the other hand, a (101) plane diffraction peak attributed to the hexagonal crystal structure is observed around $2\theta=44.5°$. When the graphite material contains artificial graphite only, almost no rhombohedral crystal structure is present, and a diffraction peak attributed to the rhombohedral crystal structure is barely observed. The higher the content of the natural graphite is, the greater the ratio of the rhombohedral crystal structure is. Depending on the ratio of the rhombohedral crystal structure, the content of the natural graphite in the graphite material is determined.

(Alkali Metal Salt)

The alkali metal salt contributes to the surface modification of natural graphite. Examples of the alkali metal contained in the alkali metal salt include lithium, sodium, potassium, rubidium, cesium, and francium, among which lithium is preferable. Examples of the alkali metal salt include silicate, carbonate, citrate, and hydroxide, among which silicate is preferable.

In view of improving the high-temperature storage characteristics, the amount of the alkali metal salt in the negative electrode material is preferably less than 10 parts by mass per 100 parts by mass of the graphite material, more preferably 5 parts by mass or less to 100 parts by mass of the graphite material.

In view of improving the thermal stability of the coating layer, the alkali metal salt is preferably a lithium silicate. In view of the chemical stability and the lithium ion conductivity, the lithium silicate is preferably represented by a formula: $Li_{2x}SiO_{(2+x)}$, where $0<x<2$. In this case, the lithium silicate does not include $Li_4SiO_4$ (x=2) $Li_4SiO_4$ is chemically unstable, and when reacting with moisture, readily elutes alkali components therefrom. This may cause troubles during production of the negative electrode, or deterioration of the negative electrode.

In view of further improving the chemical stability, more preferably $x \leq \frac{1}{2}$. More preferably, $\frac{1}{4} \leq x \leq \frac{1}{2}$.

Silicon particles are preferably dispersed in a phase of the lithium silicate. That is, they preferably constitute composite particles (hereinafter referred to as LSX particles) comprising a lithium silicate phase and silicon particles dispersed in the lithium silicate phase. Silicon particles, because of its ability to absorb much lithium ions, can contribute to a higher capacity of the negative electrode.

(Metal Material)

The metal material contributes to the facilitation of the surface modification of the natural graphite by the reaction with the alkali metal salt and the improvement of the thermal stability of the coating layer. In the negative electrode material, the metal material is present in a metal state. The metal material includes at least one selected from the group consisting of Fe, Mn, Mg, Ni, Pd, Rh, Os, and Pt, of which Fe and Ni are preferred, and Fe is more preferred.

In view of improving the battery capacity and the high-temperature storage characteristics, the amount of the metal material in the negative electrode material is preferably less than 0.2 parts by mass, more preferably 0.15 parts by mass or less, and still more preferably 0.1 parts by mass or less, per 100 parts by mass of the graphite material.

When the alkali metal salt is a lithium silicate, and the metal material is Fe, in view of improving the high-temperature storage characteristics, an amount M1 of the lithium silicate and an amount M2 of Fe preferably satisfy a relational expression: $10 \leq M1/M2 \leq 300$. M1/M2 is more preferably 15 to 300. When M1/M2 is 15 or more, the amount of Fe contained in the negative electrode material can be moderately adjusted. This can sufficiently secure the amount of the graphite material (active material) contained in the negative electrode material, which can fully increase the battery capacity. More preferably, M1/M2 is 30 to 100. Here, the amount M1 of the lithium silicate is an amount (part by mass) per 100 parts by mass of the graphite material; the amount M2 of Fe is an amount (part by mass) per 100 parts by mass of the graphite material.

The mass ratio among the graphite material, the alkali metal salt, and the metal material, those constituting the negative electrode material, can be determined by, for example, subjecting the negative electrode (negative electrode mixture layer) taken out from a disassembled battery to a high-temperature combustion capacity method or ICP emission spectrometry.

(LSX Particles Containing Metal Material)

The metal material is preferably present in the lithium silicate phase of the LSX particles. The metal material can be easily incorporated into the lithium silicate phase in a later-described LSX particle production process.

Description will be given below of the LSX particles containing the above-described metal material.

The LSX particles have an average particle diameter of preferably 1 to 25 μm, more preferably 4 to 15 μm. In this case, the LSX particles can be easily mixed with natural graphite particles (e.g., average particle diameter: 10 to 50 μm) in the negative electrode slurry, allowing the surface modification of the natural graphite to proceed efficiently. Furthermore, the stress caused by changes in volume of the LSX particles during charging and discharging can be easily further suppressed low, leading to excellent cycle characteristics. Moreover, the LSX particles can have a moderate surface area, which can suppress the capacity reduction due to a secondary reaction with the non-aqueous electrolyte.

The average particle diameter of the LSX particles means a particle diameter at 50% cumulative volume (volume average particle diameter) in a volumetric particle diameter distribution measured by a laser diffraction/scattering method. As the measuring instrument, for example, "LA-750", available from Horiba, Ltd. (HORIBA) can be used.

The LSX particles may include other components, in addition to the lithium silicate phase, silicon particles, and the above-described metal material. For example, the lithium silicate phase may contain, in addition to the lithium silicate, a small amount of crystalline or amorphous $SiO_2$. The content of $SiO_2$ in the composite particles is, for example, preferably, less than 10 mass %, more preferably less than 7 mass %.

The content of the silicon particles (Si simple substance) in the LSX particles (lithium silicate phase and silicon particles) is preferably 20 mass % to 95 mass %, more preferably 35 mass % to 75 mass %, in view of achieving a higher capacity and improving the cycle characteristics. In this case, a high charge-discharge capacity can be secured, and lithium ions can be diffused favorably. This easily leads to excellent load characteristics. Furthermore, the surface area of the silicon particle which is exposed without covered by the lithium silicate phase and comes in contact with the non-aqueous electrolyte is reduced. This can suppress the degradation of the cycle characteristics.

The average particle diameter of the silicon particles is, before initial charging, 500 nm or less, preferably of 200 nm or less, more preferably 50 nm or less. The silicon particles moderately refined as above undergo less changes in volume during charging and discharging, improving the structural stability. The average particle diameter of the silicon particles can be measured by observing cross sections of the LSX particles using SEM or TEM. Specifically, it can be determined by averaging the maximum diameters of optional 100 silicon particles.

The amount of the metal material per 100 parts by mass of the LSX particles (lithium silicate phase and silicon particles) is preferably 0.1 to 2.0 parts by mass. When the amount of the metal material is within the above range, the high-temperature storage characteristics of the battery can be enhanced, without significantly affecting the specific capacity.

In view of further improving the reliability of forming a coating layer with excellent thermal stability, in the LSX particles, particles of the metal material, like the silicon particles, are preferably substantially uniformly dispersed in the lithium silicate phase. The particles of the metal material have an average diameter of preferably 200 nm or less, more preferably 100 nm or less. When the average diameter of the particles of the metal material is within the above range, the particles of the metal material can be readily present in the lithium silicate phase in a uniformly dispersed state. The average diameter of the particles of the metal material can be determined similarly to that of the silicon particles.

In view of chemical stability, ease of production, and lithium ion conductivity, the lithium silicate phase is preferably mainly composed of at least one of $Li_2Si_2O_5$ (x=½) and $Li_2SiO_3$ (x=1), and more preferably, mainly composed of $Li_2Si_2O_5$. In addition to the above main component, the lithium silicate phase may contain a little amount of other phases, such as $Li_2Si_3O_7$, $Li_2Si_4O_9$, $Li_2Si_5O_{11}$, $Li_2Si_6O_{13}$, $Li_2Si_7O_{15}$, $Li_2Si_8O_{17}$, $Li_2Si_9O_{19}$, and $Li_2Si_{10}O_{21}$.

The content of the main component in the lithium silicate phase is preferably 50 mass % or more, more preferably 80 mass % or more. In this case, elution of the alkali component from the lithium silicate phase can be suppressed, and inconveniences caused by the alkali component, such as deterioration of the negative electrode, can be prevented. The content of the main component in the lithium silicate phase can be measured by Si-NMR.

Description will be given below of an example of a method for producing LSX particles containing the metal material.

Step (i)

A mixture of silicon dioxide and a lithium compound can be used as a raw material of the lithium silicate. By sintering the mixture, a lithium silicate having a predetermined composition ratio can be obtained. For example, when the raw material is prepared to have a Si/Li atomic ratio of 1, $Li_2Si_2O_5$ can be obtained.

Examples of the lithium compound include lithium carbonate, lithium oxide, lithium hydroxide, and lithium hydride. These may be used singly or in combination of two or more kinds.

The mixture of silicon dioxide and a lithium compound is heated in air at 400° C. to 1200° C., more preferably at 800° C. to 1100° C., to allow the silicon dioxide to react with the lithium compound.

Step (ii)

Next, a raw material silicon is blended with the lithium silicate, into a composite.

Specifically, first, a raw material silicon, the lithium silicate, and the metal material such as Fe are mixed at a predetermined mass ratio. As the raw material silicon, coarse silicon particles having an average particle diameter of several μm to several tens μm may be used. Next, the mixture is stirred while being pulverized into very small particles, using a pulverizing machine, such as a ball mill. Alternatively, the raw material silicon, the lithium silicate, and the metal material may be respectively pulverized separately into very small particles, and then mixed together. Alternatively, without using a pulverizing machine, silicon nanoparticles, lithium silicate nanoparticles, and nanoparticles of the metal material may be synthesized, and mixed together.

Next, the mixture pulverized into very small particles is heated at 450° C. to 1000° C. in, for example, an inert atmosphere (e.g., argon or nitrogen atmosphere), to be sintered. The mixture may be heated with pressure applied by a hot press or the like, into a sintered body of the mixture. The lithium silicate is stable at 450° C. to 1000° C., and hardly reacts with silicon or the metal material; therefore, the reduction in capacity, if occurred, is very small.

The sintered body is then pulverized into granules, which can be used as the LSX particles. Here, by selecting the pulverizing conditions as appropriate, LSX particles having an average particle diameter of 1 to 25 μm can be obtained. By mixing the raw material silicon, the lithium silicate, and the metal material together as described above, the metal material can be easily dispersed in the lithium silicate phase of the LSX particles.

Step (iii)

Next, the surfaces of the LSX particles may be at least partially coated with an electrically conductive material, to ken an electrically conductive layer thereon. The conductive material is preferably electrochemically stable. Specifically, the conductive material is preferably a carbon material. Examples of a method of coating a particulate material with a carbon material include: a CVD method using a hydrocarbon gas, such as acetylene or methane, as a raw material; and a method in which a particulate material is mixed with coal pitch, petroleum pitch, phenol resin, or the like, and then heated and carbonized. In another exemplary method, carbon black may be allowed to adhere to the surface of a particulate material.

The conductive layer formed on the LSX particles by coating with an electrically conductive material is preferably thin enough not to practically influence the average particle diameter of the LSX particles. The thickness of the conductive layer is preferably 1 to 200 nm, more preferably 5 to 100 nm, for securing conductivity and allowing for diffusion of lithium ions. The thickness of the conductive layer can be measured by observing cross sections of the particles using SEM or TEM.

Step (iv)

The LSX particles may be washed with an acid. For example, washing composite particles with an acidic aqueous solution can dissolve and remove a trace amount of $Li_2SiO_3$ or other components which may have been possibly produced in the process of forming the raw material silicon and the lithium silicate into a composite. Examples of the acidic aqueous solution include: an aqueous solution of an inorganic acid, such as hydrochloric acid, hydrofluoric acid, sulfuric acid, nitric acid, phosphoric acid, or carbonic acid; and an aqueous solution of an organic acid, such as citric acid or acetic acid.

A non-aqueous electrolyte secondary battery according to an embodiment of the present invention includes a negative electrode including the above-described negative electrode material, a positive electrode, and a non-aqueous electrolyte. Description will be given below of the negative electrode, the positive electrode, and the non-aqueous electrolyte.

[Negative Electrode]

A negative electrode incudes, for example, a negative electrode current collector, and a negative electrode mixture layer formed on a surface of the negative electrode current collector and containing a negative electrode active material. The negative electrode mixture layer can be formed by applying a negative electrode slurry comprising a negative electrode mixture dispersed in a dispersion medium, onto a surface of the negative electrode current collector, and drying the slurry. The dry applied film may be rolled, if necessary. The negative electrode mixture layer may be formed on one surface or both surfaces of the negative electrode current collector. The negative electrode mixture contains the above negative electrode material (negative electrode active material) as an essential component, and may contain optional components, such as a binder, an electrically conductive agent, and a thickener.

Examples of the negative electrode current collector include a non-porous electrically conductive base material (e.g., metal foil), and a porous electrically conductive base material (e.g., mesh, net, punched sheet). The negative electrode current collector may be made of, for example, stainless steel, nickel, a nickel alloy, copper, and a copper alloy. The negative electrode current collector may have any thickness. In view of the balance between strength and weight savings of the negative electrode, the thickness is preferably 1 to 50 µm, more preferably 5 to 20 µm.

The binder may be a resin material, examples of which include: fluorocarbon resin, such as polytetrafluoroethylene and polyvinylidene fluoride (PVDF); polyolefin resin, such as polyethylene and polypropylene; polyamide resin, such as aramid resin; polyimide resin, such as polyimide and polyamide-imide; acrylic resin, such as polyacrylic acid, polymethyl acrylate, and ethylene-acrylic acid copolymer; vinyl resin, such as polyacrylnitrile and polyvinyl acetate; polyvinyl pyrrolidone; polyether sulfone; and a rubbery material, such as styrene-butadiene copolymer rubber (SBR). These may be used singly or in combination of two or more kinds.

Examples of the conductive agent include: carbon blacks, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more kinds.

Examples of the thickener include: carboxymethyl cellulose (CMC) and modified products thereof (including salts such as Na salt); cellulose derivatives (e.g., cellulose ether), such as methyl cellulose; saponificated products of a polymer having a vinyl acetate unit, such as polyvinyl alcohol; polyether (e.g., polyalkylene oxide, such as polyethylene oxide). These may be used singly or in combination of two or more kinds.

Examples of the dispersion medium, although not particularly limited, include: water; alcohols, such as ethanol; ethers, such as tetrahydrofuran; amides, such as dimethylformamide; N-methyl-2-pyrrolidone (NMP); and a mixed solvent of these.

[Positive Electrode]

The positive electrode includes, for example, a positive electrode current collector, and a positive electrode mixture layer formed on a surface of the positive electrode current collector. The positive electrode mixture layer can be formed by applying a positive electrode slurry comprising a positive electrode mixture dispersed in a dispersion medium, onto a surface of the positive electrode current collector, and drying the slurry. The dry applied film may be rolled, if necessary. The positive electrode mixture layer may be formed on one surface or both surfaces of the positive electrode current collector. The positive electrode mixture contains a positive electrode active material as an essential component, and may contain optional components, such as a binder, an electrically conductive agent, and a thickener.

The positive electrode active material may be a lithium composite metal oxide. Examples of the lithium composite metal oxide include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, and $Li_2MePO_4F$. Here, M is at least one element selected from the group consisting of Na, Mg, Sc, Y, Mn, Fe, Co, Ni, Cu, Zn, Al, Cr, Pb, Sb, and B. Me contains at least one transition metal (e.g., at least one element selected from the group consisting of Mn, Fe, Co, and Ni). a=0 to 1.2, b=0 to 0.9, and c=2.0 to 2.3. The value a representing the molar ratio of lithium is a value upon production of the active material and subjected to increase and decrease during charging and discharging.

Examples of the binder, the conductive agent, the thickener, and the dispersion medium are as those exemplified for the negative electrode. The conductive agent may be graphite, such as natural graphite and artificial graphite.

The form and the thickness of the positive electrode current collector may be respectively selected from the forms and the range corresponding to those of the negative electrode current collector. The positive electrode current collector may be made of, for example, stainless steel, aluminum, an aluminum alloy, and titanium.

[Non-Aqueous Electrolyte]

The non-aqueous electrolyte contains a non-aqueous solvent, and a lithium salt dissolving in the non-aqueous solvent. The concentration of the lithium salt in the non-aqueous electrolyte is, for example, 0.5 to 2 mo/L. The non-aqueous electrolyte may contain a known additive.

The non-aqueous solvent may be, for example, a cyclic carbonic acid ester, a chain carbonic acid ester, or a cyclic carboxylic acid ester. Examples of the cyclic carbonic acid esters include propylene carbonate (PC), and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL), and γ-valerolactone (GVL). These non-aqueous solvents may be used singly or in combination of two or more kinds.

Examples of the lithium salt include a lithium salt of a chlorine-containing acid (e.g., $LiClO_4$, $LiAlCl_4$, $LiB_{10}Cl_{10}$), a lithium salt of a fluorine-containing acid (e.g., $LiPF_6$, $LiBF_4$, $LiSbF_6$, $LiAsF_6$, $LiCF_3SO_3$, $LiCF_3CO_2$), a lithium salt of a fluorine-containing acid imide (e.g., $LiN(CF_3SO_2)_2$, $LiN(CF_3SO_2)(C_4F_9SO_2)$, $LiN(C_2F_5SO_2)_2$), and a lithium halide (e.g., LiCl, LiBr, LiI). These lithium salts may be used singly or in combination of two or more kinds.

[Separator]

Usually, it is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

In an exemplary structure of the non-aqueous electrolyte secondary battery, an electrode group formed by winding the positive electrode and the negative electrode with the separator interposed therebetween is housed together with the non-aqueous electrolyte in an outer case. The wound-type electrode group may be replaced with a different form of the electrode group, for example, a stacked-type electrode group formed by stacking the positive electrode and the negative electrode with the separator interposed therebetween. The non-aqueous electrolyte secondary battery may be in any form, such as cylindrical type, prismatic type, coin type, button type, or laminate type.

The Drawing is a schematic partially cut-away oblique view of a non-aqueous electrolyte secondary battery according to an embodiment of the present invention.

The battery includes a bottomed prismatic battery case 6, and an electrode group 9 and a non-aqueous electrolyte (not shown) housed in the battery case 6. The electrode group 9 has a long negative electrode, a long positive electrode, and a separator interposed between the positive electrode and the negative electrode and preventing direct contact between them. The electrode group 9 is formed by winding the negative electrode, the positive electrode, and the separator around a flat plate-like winding core, and then removing the winding core.

A negative electrode lead 11 is attached at its one end to the negative electrode current collector of the negative electrode, by means of welding or the like. A positive electrode lead 14 is attached at its one end to the positive electrode current collector of the positive electrode, by means of welding or the like. The negative electrode lead 11 is electrically connected at its other end to a negative electrode terminal 13 disposed at a sealing plate 5. The positive electrode lead 14 is electrically connected at its other end to a battery case 6 serving as a positive electrode terminal. A resin frame member 4 is disposed on top of the electrode group 9, the frame member serving to separate the electrode group 9 from the sealing plate 5, as well as to separate the negative electrode lead 11 from the battery case 6. The opening of the battery case 6 is sealed with the sealing plate 5.

EXAMPLES

The present invention will be specifically described below with reference to Examples and Comparative Examples. The present invention, however, is not limited to the following Examples.

Example 1

[Preparation of Graphite Material]

A graphite material was prepared, which was a mixture of powdered natural graphite (average particle diameter 20 μm) and powdered artificial graphite (average particle diameter 20 μm). The mass ratio of the natural graphite to the artificial graphite was 70:30.

[Production of LSX Particles]

Step (i)

Silicon dioxide was mixed with lithium carbonate in an atomic ratio: Si/Li=1, and the mixture was heated in air at 950° C. for 10 hours, to obtain a lithium silicate represented by $Li_2Si_2O_5$. The obtained lithium silicate was pulverized to have an average particle diameter of 10 μm.

Step (ii)

Powdered $Li_2Si_2O_5$ (average particle diameter: 10 μm) serving as a lithium silicate, powdered raw material silicon (3N, average particle diameter: 10 μm), and powdered Fe (average particle diameter: 100 μm) serving as a metal material were mixed in a mass ratio of 50:50:1. The mixture was placed in a pot (made of SUS, volume: 500 mL) of a planetary ball mill (P-5, available from Fritsch Co., Ltd.), together with 24 SUS balls (diameter: 20 mm). With the lid of the pot closed, the mixture was pulverized at 200 rpm for 50 hours in an inert atmosphere.

Next, the powdered mixture was taken out from the pot in an inert atmosphere and, in an inert atmosphere, sintered at 600° C. for 4 hours with a predetermined pressure applied by a hot press, to give a sintered body of the mixture.

Step (iii)

Thereafter, the sintered body was pulverized and passed through a 40-μm mesh, and then mixed with coal pitch (MCP 250, available from JFE Chemical Corporation). The mixture was heated at 800° C. for 5 hours in an inert atmosphere, to coat the composite particles with an electrically conductive carbon, so that a conductive layer is formed on the particle surfaces. The amount of the conductive layer was 5 mass % to the total mass of the composite particles and the conductive layer. Thereafter, LSX particles having the conductive layer on their surfaces (average particle diameter: 10 μm) were obtained using a sieve.

[Analysis of LSX Particles]

The cross sections of the LSX particles were observed under a scanning electron microscope (SEM). The observation found that Si particles having an average diameter of 50 nm were dispersed substantially uniformly in a matrix consisting of $Li_2Si_2O_5$. The observation also found that Fe particles having an average particle diameter of 100 nm were dispersed in the matrix consisting of $Li_2Si_2O_5$. In the XRD pattern of the LSX particles, diffraction peaks mainly attributed to Si simple substance and $Li_2Si_2O_5$ were observed. The peak intensities were $Li_2Si_2O_5 <$ Si.

Si-NMR analysis was performed to confirm that the content of Si particles in the LSX particles (lithium silicate phase and Si particles) was 50 mass %. ICP emission spectrometry was performed to confirm that the amount of Fe per 100 parts by mass of the LSX particles (lithium silicate phase and Si particles) was 1 part by mass. The above results showed that the mass ratio of the lithium silicate to Fe was 50.

[Production of Negative Electrode]

A graphite material was mixed with the LSX particles having the conductive layer on their surfaces, and the mixture was used as a negative electrode material (negative electrode active material). The amount of the LSX particles (lithium silicate phase and Si particles) was 3 parts by mass per 100 parts by mass of the graphite material. The amount of the lithium silicate was 1.5 parts by mass per 100 parts by mass of the graphite material. The amount of Fe was 0.03 parts by mass per 100 parts by mass of the graphite material.

The negative electrode active material, sodium carboxymethyl cellulose (CMC-Na), and styrene-butadiene rubber (SBR) were mixed in a mass ratio of 97.5:1:1.5. The mixture was added with water, and then stirred in a mixer (T. K. HIVIS MIX, available from PRIMIX Corporation), to prepare a negative electrode slurry. Next, the negative electrode slurry was applied onto copper foil. The applied films were dried, and then rolled, to give a negative electrode with a negative electrode mixture layer having a density of 1.5 g/cm³ formed on both sides of the copper foil.

[Production of Positive Electrode]

Lithium cobalt oxide, acetylene black, and polyvinylidene fluoride were mixed in a mass ratio of 95:2.5:2.5. The mixture was added with N-methyl-2-pyrrolidone (NMP), and then stirred in a mixer (T.K. HIVIS MIX, available from PRIMIX Corporation), to prepare a positive electrode slurry. Next, the positive electrode slurry was applied onto aluminum foil. The applied films were dried, and then rolled, to give a positive electrode with a positive electrode mixture layer having a density of 3.6 g/cm³ on both sides of the aluminum foil.

[Preparation of Non-Aqueous Electrolyte]

In a mixed solvent containing ethylene carbonate (EC) and diethyl carbonate (DEC) in a volume ratio of 3:7, $LiPF_6$ was dissolved at concentration of 1.0 mol/L, to prepare a non-aqueous electrolyte.

[Fabrication of Non-Aqueous Electrolyte Secondary Battery (Laminate-Type Battery)]

The positive electrode and the negative electrode, with a tab attached to each electrode, were wound spirally with a separator interposed therebetween such that the tabs were positioned at the outermost layer, thereby to form an electrode group. The electrode group was inserted into an outer case made of aluminum laminate film and dried under vacuum at 105° C. for 2 hours. The non-aqueous electrolyte was injected into the case, and the opening of the outer case was sealed. A non-aqueous electrolyte secondary battery (design capacity: 800 mAh) was thus obtained.

Examples 2 to 4

Non-aqueous electrolyte secondary batteries were fabricated in the same manner as in Example 1, except that the LSX particles (lithium silicate phase and Si particles) were contained in an amount as shown in Table 1, per 100 parts by mass of the graphite material.

Example 5

A non-aqueous electrolyte secondary battery was fabricated in the same manner as in Example 1, except that Fe was contained in an amount of 0.15 parts by mass per 100 parts by mass of the graphite material.

Example 6

A non-aqueous electrolyte secondary battery was fabricated in the same manner as in Example 1, except that Fe was contained in an amount of 0.1 parts by mass per 100 parts by mass of the graphite material.

Example 7

A non-aqueous electrolyte secondary battery was fabricated in the same manner as in Example 1, except that Fe was contained in an amount of 0.01 parts by mass per 100 parts by mass of the graphite material.

Example 8

A non-aqueous electrolyte secondary battery was fabricated in the same manner as in Example 1, except that Fe was contained in an amount of 0.005 parts by mass per 100 parts by mass of the graphite material.

Comparative Example 1

A non-aqueous electrolyte secondary battery was fabricated in the same manner as in Example 2, except that no Fe was used in the step (ii) of producing LSX particles.

Comparative Examples 2 to 4

Non-aqueous electrolyte secondary batteries were fabricated in the same manner as in Example 2, except that, in place of the LSX particles, SiO particles comprising a $SiO_2$ phase and Si particles dispersed therein were used, and the natural graphite content in the graphite material was changed as shown in Table 2.

The batteries of Examples and Comparative Examples were evaluated for high-temperature storage characteristics by the following method.

[High-Temperature Storage Characteristics]

The batteries of Examples and Comparative Examples were subjected to charging and discharging as below, to determine a discharge capacity before storage.

<Charging>

In a 25° C. environment, the battery was subjected to a constant-current charging at a current of 800 mA until the voltage reached 4.2 V, and then a constant-voltage charging at a voltage of 4.2 V until the current reached 40 mA. After charging, the battery was left to stand for 20 minutes in a 25° C. environment.

<Discharging>

After left to stand, in a 25° C. environment, the battery was subjected to a constant-current discharging at 800 mA until the voltage reached 2.75 V.

The batteries of Examples and Comparative Examples, which were prepared separately, were subjected to charging under the same conditions as above, and stored for one day in an 80° C. environment. After storage, the batteries were subjected to discharging under the same conditions as above, to determine a discharge capacity after storage.

Using the discharge capacities before and after storage as determined above, a capacity retention ratio after high-temperature storage was obtained from the following expression.

Capacity retention ratio after high-temperature storage(%)=(Discharge capacity after storage/Discharge capacity before storage)×100

The evaluation results are shown in Tables 1 and 2.

TABLE 1

| | Natural graphite content in graphite material (mass %) | LSX particles amount per100 pts. by mass of graphite material (pts. by mass) | Lithium silicate amount per 100 pts. by mass of graphite material (pts. by mass) | Fe amount per100 pts. by mass of graphite material (pts. by mass) | Mass ratio of lithium silicate to Fe | Capacity retention rate after high-temperature storage (%) |
|---|---|---|---|---|---|---|
| Com. Ex. 1 | 70 | 6 | 3.0 | Not added | — | 87.2 |
| Ex. 1 | 70 | 3 | 1.5 | 0.03 | 50 | 88.0 |
| Ex. 2 | 70 | 6 | 3.0 | 0.06 | 50 | 89.1 |

TABLE 1-continued

|  | Natural graphite content in graphite material (mass %) | LSX particles amount per 100 pts. by mass of graphite material (pts. by mass) | Lithium silicate amount per 100 pts. by mass of graphite material (pts. by mass) | Fe amount per 100 pts. by mass of graphite material (pts. by mass) | Mass ratio of lithium silicate to Fe | Capacity retention rate after high-temperature storage (%) |
|---|---|---|---|---|---|---|
| Ex. 3 | 70 | 9 | 4.5 | 0.09 | 50 | 87.9 |
| Ex. 4 | 70 | 20 | 10.0 | 0.20 | 50 | 87.6 |
| Ex. 5 | 70 | 3 | 1.5 | 0.15 | 10 | 88.0 |
| Ex. 6 | 70 | 3 | 1.5 | 0.10 | 15 | 88.0 |
| Ex. 7 | 70 | 6 | 3.0 | 0.01 | 300 | 88.3 |
| Ex. 8 | 70 | 6 | 3.0 | 0.005 | 600 | 87.4 |

TABLE 2

|  | Natural graphite content in graphite material (mass %) | SiO particles amount per 100 pts. by mass of graphite material (pts. by mass) | Lithium silicate amount per 100 pts. by mass of graphite material (pts. by mass) | Fe amount per 100 pts. by mass of graphite material (pts. by mass) | Capacity retention rate after high-temperature storage (%) |
|---|---|---|---|---|---|
| Com. Ex. 2 | 20 | 6 | Not added | Not added | 87.5 |
| Com. Ex. 3 | 40 | 6 | Not added | Not added | 87.1 |
| Com. Ex. 4 | 70 | 6 | Not added | Not added | 86.7 |

In the batteries of Examples 1 to 8, as compared to the battery of Comparative Example 1, the capacity retention rates after high-temperature storage were high, showing that the high-temperature storage characteristics were excellent. In the battery of Comparative Example 1, due to the absence of Fe in the negative electrode material, the high-temperature storage characteristics were degraded. In the batteries of Examples 1 to 3, in which the amount of lithium silicate was less than 10 parts by mass, and the amount of Fe was less than 0.2 parts by mass, as compared to the battery of Example 4, the high-temperature storage characteristics were improved. In the batteries of Examples 5 to 7, in which the mass ratio of lithium silicate to Fe was 10 to 300, as compared to the battery of Example 8, the high-temperature storage characteristics were further improved.

In the batteries of Comparative Examples 3 and 4, in which the content of natural graphite in the graphite material was 40 mass % or more, as compared to the battery of Comparative Example 2, the high-temperature storage characteristics were further degraded. Comparison between Comparative Examples 1 and 4, both containing 70 mass % natural graphite in the graphite material, showed that using LSX particles instead of the SiO particles improved the high-temperature storage characteristics; however, as compared to Examples, the high-temperature storage characteristics in these Comparative Examples were poor. On the other hand, in the batteries of Examples 1 to 8 containing Fe in the negative electrode material (LSX particles), the high-temperature storage characteristics were improved, even though the content of natural graphite in the graphite material was as high as 70 mass %.

INDUSTRIAL APPLICABILITY

The non-aqueous electrolyte secondary battery of the present invention is useful as a main power source for mobile communication devices and portable electronic devices.

REFERENCE SIGNS LIST 4 frame member
5 sealing plate
6 battery case
9 electrode group
11 negative electrode lead
13 negative electrode terminal
14 positive electrode lead

The invention claimed is:

1. A negative electrode material, comprising
a graphite material,
an alkali metal salt, and
at least one metal material selected from the group consisting of Fe, Mn, Mg, Ni, Pd, Rh, Os, and Pt,
the graphite material containing natural graphite,
wherein a content of the natural graphite in the graphite material is 40 mass % or more, and
wherein an amount of the metal material is less than 0.2 part by mass per 100 parts by mass of the graphite material.

2. The negative electrode material of claim 1, wherein an amount of the alkali metal salt is less than 10 parts by mass per 100 parts by mass of the graphite material.

3. The negative electrode material of claim 1, wherein the alkali metal salt contains a lithium silicate.

4. The negative electrode material of claim 3, wherein the lithium silicate is represented by a formula: $Li_{2+x}SiO_{(2+x)}$, where $0<x<2$.

5. The negative electrode material of claim 3, wherein
silicon particles are dispersed in a phase of the lithium silicate,
the metal material is present in the phase of the lithium silicate.

6. The negative electrode material of claim 3, wherein
the metal material contains Fe,
an amount M1 of the lithium silicate and an amount M2 of Fe satisfy a relational expression:

$15 \leq M1/M2 \leq 300$.

7. The negative electrode material of claim 1, wherein the metal material contains Fe.

8. A non-aqueous electrolyte secondary battery, comprising a negative electrode including the negative electrode material of claim 1, a positive electrode, and a non-aqueous electrolyte.

* * * * *